United States Patent [19]
Frankenfeld et al.

[11] 3,764,657
[45] Oct. 9, 1973

[54] PROCESS FOR REMOVAL OF CATIONIC IMPURITIES FROM TECHNICAL GRADE PHOSPHORIC ACID

[75] Inventors: Klaus Frankenfeld, Kirberg/Taunus; Karl Götzmann, Budenheim/Rhine, both of Germany

[73] Assignee: Chemische Fabrik, Budenheim, Germany

[22] Filed: Sept. 21, 1971

[21] Appl. No.: 182,534

[30]       Foreign Application Priority Data
    Oct. 14, 1970   Germany.................. P 20 50 406.7

[52] U.S. Cl. ................................................ 423/321
[51] Int. Cl............................................. C01b 25/16
[58] Field of Search .............. 23/165, 165 B, 165 C; 423/321

[56]           References Cited
           UNITED STATES PATENTS
3,650,691   3/1972   Reulecke et al. ...................... 23/165
1,929,441   10/1933  Milligan ................................ 23/165

FOREIGN PATENTS OR APPLICATIONS
464,370   4/1937   Great Britain ........................ 23/165

*Primary Examiner*—Edward J. Meros
*Assistant Examiner*—Gregory A. Heller
*Attorney*—Marn & Jangarathis

[57]           ABSTRACT

Technical grade phosphoric acid is purified of cationic impurities by adding thereto alkali or ammonium ions and a water soluble organic solvent whereby a flaky, easily filterable precipitate is formed which is subsequently separated from the filtrate. The filtrate is passed through a highly acidic cationic exchange resin in the H+ form. The organic solvent is distilled from the filtrate to produce purified phosphoric acid. The source of alkali ions include gaseous ammonia, alkali and ammonium hydroxide and/or alkali and ammonium salts with the addition being of from 0.06 to 0.12 mols of alkali ions per mol of $P_2O_5$. The water soluble organic solvent is preferably isopropanol and is added in an amount of from two to five times the amount with respect to the raw phosphoric acid.

6 Claims, No Drawings

PROCESS FOR REMOVAL OF CATIONIC IMPURITIES FROM TECHNICAL GRADE PHOSPHORIC ACID

This invention relates to the purification of phosphoric acid, and more particularly to a process for removing cationic impurities from phosphoric acid produced by the wet process.

BACKGROUND OF THE INVENTION

Phosphoric acid is generally produced in accordance with two processes. In one process, phosphoric acid is produced from phosphate ore by contact with a strong mineral acid, such as sulfuric acid. Calcium in the phosphate ore is generally separated in the process as gypsum whereas the other constituents in the phosphate ore remain in the phosphoric acid as dissolved solids or soluble salts to the extent they cannot form slightly soluble compounds in the strongly acid medium with either sulfuric or phosphoric acid. In many instances, these impurities interfere with the further use of the phosphoric acid, and often the employment of technical grade acid for many purposes is rendered impossible by these impurities. Efforts have not been lacking, therefore, to free the phosphoric acid or its alkaline salts of such impurities. In one long-used purification method the phosphoric acid is neutralized with alkalis. Accordingly, the impurities dissolved in the raw acid are precipitated as slightly soluble salts or metal hydroxides. This method is therefore suitable as a purifying method only if the phosphoric acid is to be converted into its alkali salts.

If compounds other than alkali phosphates are to be made from the phosphoric acid, then purification methods are required whereby the free acid remains. As disclosed in German Pat. No. 648,295, there is described a method of purifying raw phosphoric acid by treating the phosphoric acid with an organic solvent in the presence of an alkali compound whereby the impurities such as calcium, iron, aluminum, chromium, vanadium and fluorine are removed as a precipitate. Mentioned are methyl and ethyl alcohol and acetone. Alkaline compounds used in the process include free alkali and ammonium base, the salts of sulfuric acid, oxalic acid, carbonic acid, nitric acid and the like. The amount of alkaline compound to be added is set optionally at 10 – 15 percent with respect to the raw phosphoric acid. Because of the large amounts of alkaline compounds required for purification, a partial desaturation of the phosphoric acid is effected. Thus, computation of the numerical values set forth in the examples, shows that about 18.5 percent of the available phosphoric acid is monobasically desaturated. Corresponding to such high level of partial desaturation, the yield of purified phosphoric acid is poor. Also, the phosphoric acid is contaminated with alkali compounds partially dissolved in the phosphoric acid. Additionally, the impurities settle-out as viscous, green clumps of oily appearance which only gradually become discrete. Such a slimy precipitate can be separated only with great difficulty (e.g. decantation), so that a division of the phases is technologically uncontrollable because the solid phase constantly changes in consistency.

OBJECTS OF THE INVENTION

An object of this invention is to provide an improved process for purifying phosphoric acid.

Another object of this invention is to provide an improved process for effectively removing cationic impurities from phosphoric acid produced by the wet acid process.

DETAILED DESCRIPTION OF THE INVENTION

These and other objects of the invention are accomplished by effecting the precipitation of cationic impurities by using a water soluble organic solvent and alkali or ammonium ions, where the ratio of ions amounts to 0.06 to 0.12 mole per mol of $P_2O_5$. The precipitate is filtered and the filtrate passed through a highly acidic cationic exchange resin in the $H^+$ form. The solvent is fractionated from the filtrate to reconstitute the phosphoric acid. Accordingly, the impurities are separated out as flaky, easily settling and readily filterable solids.

The alkaline compounds to be added include alkali or ammonium hydroxides, alkali or ammonium salts and gaseous ammonia. The amount of alkali ions to be added is about 0.06 to 0.12 mols per mol of $P_2O_5$ in the raw phosphoric acid. Isopropyl alcohol was found particularly useful as the solvent. The amount of solvent added varies between about two to five times the amount with respect to the raw phosphoric acid. A part of the added alkali — or ammonium ions remains behind in the solvent — phosphoric acid phase as dissolved salts. As the case may be, depending on the concentration of the phosphoric acid and the ratio to the aqueous acid to alcohol, the proportion of dissolved alkali — or ammonium salts in the purified phosphoric acid can reach 50 to 70 percent of the quantity added.

The alkali — or ammonium salts are removed according to the inventive process by subsequently passing phosphoric acid through a highly acidic cationic exchange resin in $H^+$ form Surprisingly, it has been found that a phosphoric acid (diluted with an organic alcohol) having a $H_3PO_4$ content of up to 30 percent can be readily purified by such a resin with high utilization factor of the resin capacity. The surprising aspect of the invention in readily apparent when one considers that normally 10 percent or less of the mineral acid is used for the purpose of converting charged, highly acidic cationic exchanger resin into the H+ FORM. On the basis of this, one would have expected that from acids at such concentrations no cations would be exchanged for H+ ions. By means of the process of this invention not only are the alkalis remaining behind in the previously purified phosphoric acid removed and the yield of free phosphoric acid thereby increased, but also other cations in the starting raw phosphoric acid and which were not diminished or which were only partly reduced in amount by the preceding precipitation procedure are completely removed.

The purified acid according to the process of the invention contains none of the original 1-, 2- and 3- valent cations present in the raw acid in quantities demonstrable by the normal methods. Only the iron and chromium are sometimes perceptible in small traces. Naturally the persisting remainder is dependent on the starting concentration. The impurities remaining behind lie in the order of magnitude of from 0.5 to 1 percent relative to the starting concentration. An acid purified according to the present invention for a $P_2O_5$ content of 50 percent still has a iron content of from 0.001 to 0.003 percent and a chromium content of 0.001 to 0.002 percent. Due to the small amounts of ammonium or alkali ions required to be added, the amount of the solid phase is smaller and can be sharply compressed and rinsed with alcohol.

Additionally, there is a considerable reduction in the $P_2O_5$ losses. Because of the small of ammonium ions introduced, there is a reduction in the settling out of the solid phase since a flaky, easily filterable precipitate is formed as distinguished from the viscous oily mass of the prior art. This flaky precipitate can be pressed out to large degree and rinsed with alcohol. $P_2O_5$ losses are necessarily dependent on the level of impurities in the raw acid, and vary between 3 to 6 percent with respect to the quantity of $P_2O_5$ in the starting acid.

In operation, a customary amount of raw acid is placed in a mixing vessel. The alkali ions are added in an amount, based on the $P_2O_5$ content, with continuous stirring. When using ammonium hydroxide or gaseous ammonia, a slight temperature elevation of from 5 to 8°C. will occur. After the alkali addition, an appropriate amount of isopropanol is added to the liquid with stirring. A fine, white to light gray precipitate settles out which at once coalesces into rather large flakes. This tendency is further reinforced by stirring for an additional period of time of from 2 to 5 minutes. After transfer from the mixing vessel, the precipitate settles quickly to the bottom. The liquid standing above is clear. The precipitate is separated from the solution by filtration and is rinsed with about 10 percent of the amount of solvent medium. The filtrate is passed through a highly acidic cationic exchange resin in the H+ form and subsequently freed of solvent in a distillation apparatus with the phosphoric acid remaining therein. The distilled solvent can be rinsed and recycled for additional purification operations. It will be understood that the process of the invention can be conducted batchwise as well as continuously.

Numerous modifications and variations of the invention are possible in the light of the above teachings and therefore the invention may be practiced otherwise than as particularly described.

What is claimed is:

1. A process for purifying technical grade phosphoric acid which comprises:
   a. adding alkali ions to said phosphoric acid, the amount of alkali ions being from 0.06 to 0.12 mols per mol of $P_2O_5$ in said phosphoric acid;
   b. adding a water soluble organic solvent to said phosphoric acid, said organic solvent being added in an amount of from 2 to 5 times the amount of said phosphoric acid;
   c. separating a precipitate resulting from steps $a$ and $b$;
   d. passing the filtrate of $c$ through a highly acidic cationic exchange resin in the H+ form; and
   e. distilling the solvent from the filtrate of step $d$.

2. The process as defined in claim 1 wherein the organic solvent added is less than about 30 volume percent.

3. The process as defined in claim 1 wherein isopropanol is said water soluble alcohol.

4. The process as defined in claim 1 wherein the alkali ion is introduced in the form of gaseous ammonia.

5. The process as defined in claim 1 wherein the alkali ion is introduced is ammonium hydroxide.

6. The process as defined in claim 1 wherein the alkali ion is introduced in the form of an ammonium salt.

* * * * *